United States Patent Office 3,540,148
Patented Nov. 17, 1970

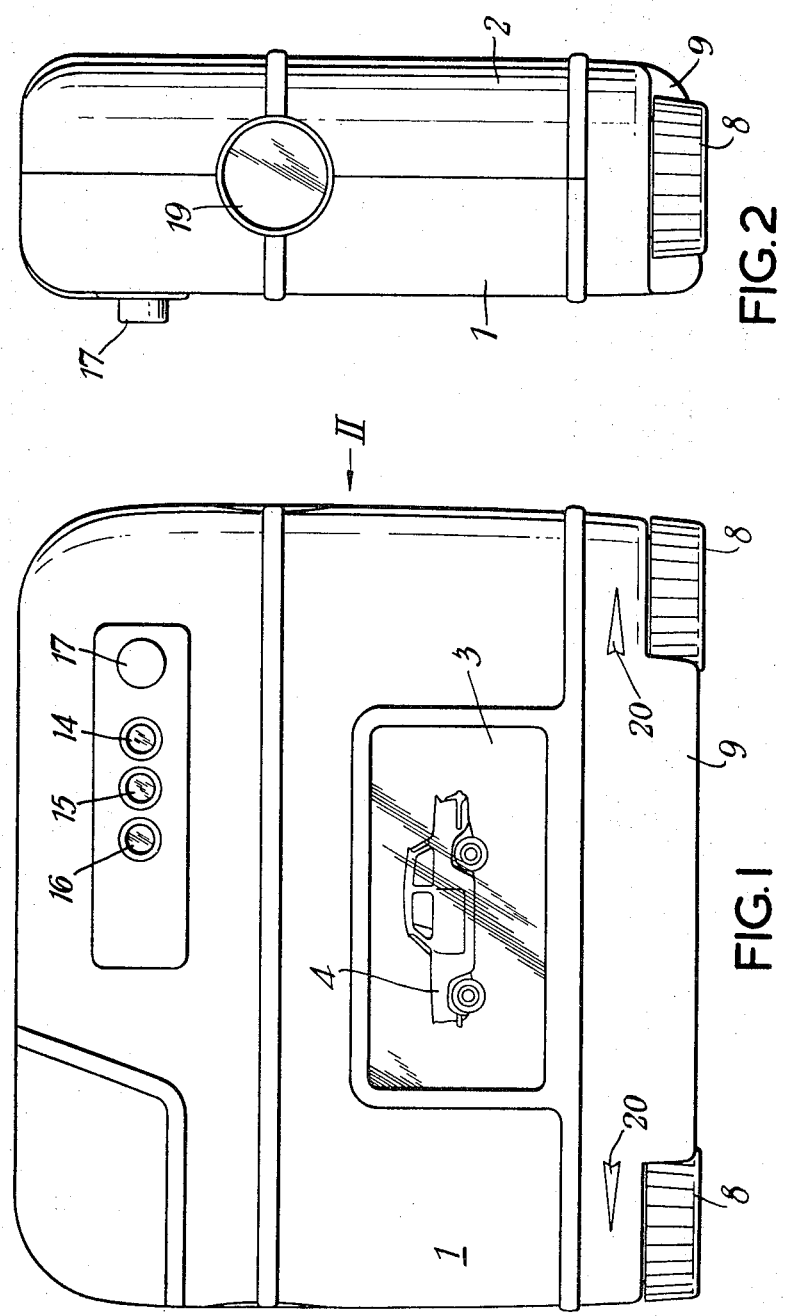

3,540,148
RECORDING DEVICE
Harry Reynolds, 15 Bronwen Court, Grove End Road,
London NW. 3, England
Filed Dec. 13, 1967, Ser. No. 690,238
Claims priority, application Great Britain, Dec. 21, 1966,
57,316/66
Int. Cl. A63h 33/00
U.S. Cl. 46—1
7 Claims

ABSTRACT OF THE DISCLOSURE

A recording device in the form of a toy having a casing, means to display alternative pictures in a window of the casing and a simple digital counter operable to record the number of objects seen that correspond to any displayed picture. The device includes a telescope and its casing simulates the appearance of a camera.

---

Figure 3:
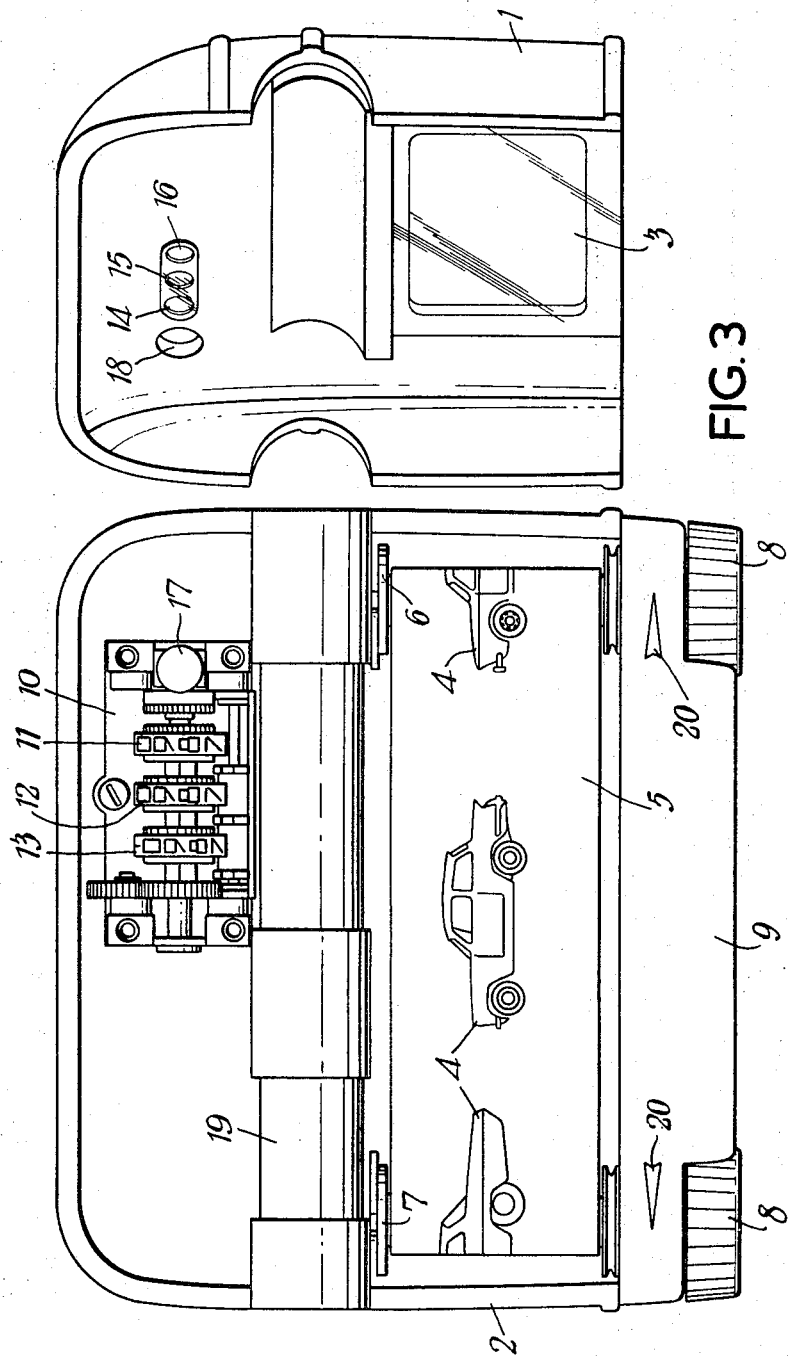

This invention relates to recording devices.

According to the invention, there is provided a recording device comprising a casing shaped to define a display window in the casing wall, means for positioning alternative pictures within said casing for viewing through the display window and a digital counter carried by said casing and operable to record the number of objects observed whch correspond to a particular displayed picture.

A device in accordance with the invention is particularly adaptable for use as a toy in which form it may be employed by a child in spotting and recording particular objects to alleviate boredom during road, rail or other journeys. For example, if the alternative pictures for display represent different makes and/or models of automobiles, one particular make and model can be selected for display in the window and, each time an automobile corresponding to that displayed is seen, the child can record the fact on the digital counter. If two or more children are each provided with a device in accordance with the invention, then each child can select either the same or different makes and models of automobiles, trucks or other vehicles so as to stage a competition to see which child has the highest score in a given time, or during the course of a particular journey.

Obviously, the pictures need not necessarily depict automobiles or other road vehicles and may, for example, depict highway signs, railroad signs, railroad vehicles, trees, dogs, stores or a host of other suitable subjects.

For a better understanding of the invention, and to show how the same may be carried into effect, reference will now be made, by way of example, to the accompanying drawings, in which:

FIG. 1 is a front elevation of a recording device in accordance with the invention, FIG. 2 is a side elevation as seen in the direction indicated by the arrow II of FIG. 1, and FIG. 3 is a view similar to FIG. 1 but with a front part of a casing of the device removed to disclose interior parts of the device.

Referring to the drawings, a hollow casing is formed by making front and rear shell parts 1 and 2 from a synthetic plastic or other suitable material. The shell parts 1 and 2 are shown as separate entities in FIG. 3 of the drawings but, if desired, they may be hingedly interconnected along the length of a common side edge and provided with cooperating fastening means on an opposite side edge. In this manner the casing, which is normally held closed, may readily be opened to reveal the interior thereof. The external configuration of the casing may be as shown in which it has approximately the same shape as a camera or, alternatively, it may be shaped to simulate a portable television set, "toy space gun," computer or other suitable item.

A display window or aperture 3 is provided in the wall of the front shell part 1 of the casing for the purpose of viewing pictures which are selectively positioned in the casing as will be described hereinafter. The display window 3 incorporates a transparent pane of glass or synthetic plastic material to protect the picture positioned therebehind but, if desired, this protective pane may be omitted.

The pictures are in the form of tracings 4 reproduced side-by-side on a length of strip material 5 which may be made from paper, a synthetic plastic, photographic safety film or from linen or other cloth. As an alternative, the tracings 4 which afford the pictures may be replaced by silhouettes or coloured reproductions of the articles or by transparencies. One end of the strip 5 is wound on a first spool 6 which is rotatably mounted within the rear shell part 2 whereas the opposite end of the strip 5 is wound on a second similarly mounted spool 7. As can be seen from FIG. 3 of the drawings, the spools 6 and 7 are mounted within the rear shell part 2 of the casing one on each side of the display window 3 in such a manner that, in winding the picture strip 5 from one spool to the other, the tracings 4 or other pictures are displayed one at a time in said window 3 against a solid or reflective background. In the event that transparencies are to be employed, the device includes a battery and an electric light bulb which can be switched on to illuminate the transparencies. It will be seen from FIG. 1 of the drawings that the size of, and spacing between, the tracings 4 or other pictures reproduced on the strip 5 is such that each picture occupies substantially the whole of the display window 3.

Instead of being wound on two similar spools 6 and 7, a single spool may be employed and the picture strip 5 can be fed to and from alternative spool means in the form of a casette. When this construction is used, interchangeable casettes may be supplied with the recording device, each casette accommodating a corresponding strip 5 and the various strips 5 carrying different series of pictures. For example, the tracing 4 or other pictures on one strip 5 may all represent different makes and models of motor vehicles as shown in the drawings while the pictures on a further strip 5 all represent different breeds of dogs.

Whether two spools 6 and 7 or one spool and a casette are used to control displacement of the picture strip 5, winding of said strip 5 is effected by knobs 8 or the like located on an external surface of a casing bottom 9 adjacent the knobs 8 to indicate the correct directions of rotation of the latter. Each knob 8 is mounted on one end of a spindle or stub shaft (not visible in the drawings) projecting through the casing bottom 9, the other end thereof being adapted to rotate the corresponding spool 6 or 7 or a casette as desired. The casing bottom 9 is not integral with the front and rear shell parts 1 and 2 of the casing and may be withdrawn downwardly from the latter to exchange a spool or casette. When two spools 6 and 7 are employed, the casing bottom 9 may, if desired, be formed in two halves that are respectively integral with the two shell parts 1 and 2.

The rear shell part 2 of the casing carries a digital counter 10 for recording the number of objects observed that correspond to the tracing 4 or other picture displaced in the window 3. It is preferred that the digital counter 10 should be of a very simple known construction such as that illustrated in the drawings. This known digital counter 10 comprises three rotatable discs 11, 12 and 13 registering "units," "tens," and "hundreds" respectively. If desired, a fourth rotatable disc may be incorporated to register "thousands." The three discs 11 to 13, which are rotatable about a common axis, are visible through corresponding windows or like apertures 14, 15 and 16 provided in the front shell part 1 of the casing. The disc 11 registering "units" is advanced one unit at a time by a first push button or plunger 17 projecting through a hole 18 in the front shell part 1 so as to lie immediately to the right of the window or like aperture 14 when the device is seen in front elevation (FIG. 1). A second push button or plunger (not shown in the drawings) is preferably provided immediately to the left of the window or aperture 16 as seen in FIG. 1 of the drawings, said second push button or plunger being operable to return the total registered on the digital counter to zero whenever required. Alternatively, zero reset may be accomplished by rotating the discs 11, 12 and 13 with the aid of knurled edges thereof. Instead of push buttons or plungers, rotatable wheels may be used to advance the disc 11 registering "units" and to return the total registered on the counter to zero.

The recording device includes a fixed focus telescope 19 through which distant objects to be recorded may be observed. The telescope 19 takes the form of a tubular member provided with a lens at each end and arranged to extend through the casing from one side edge to the opposite side edge thereof. The tubular member terminates flush with the inner surfaces of the lenses and is arranged between the strip 5 and dgital counter 10 so that it does not interfere with the operation of either of these parts. The provision of the telescope 19 is particularly desirable when the recording device is to be used as a toy in the manner which has previously been discussed.

If desired, the recording device may incorporate a colour guide or indicator whereby, having selected a picture of an object to be recorded, the colour guide may be adjusted to indicate that only such objects of a certain colour are to be recorded. For this purpose, a knurled wheel may be rotatably mounted so as to have a portion projecting through a slot in the front shell part 1 of the casing to permit manual rotation of said wheel. A number of different colour spots are printed or otherwise marked on part of the wheel and an additional aperture or window is provided in the front shell part 1 in such a way that only one colour spot at a time may be visible therethrough. It is preferred that the device should be provided with a hand strap, lanyard or neck strap (not shown) which may be attached to the casing bottom 9 of the device at a point between the two knobs 8. When the device is to be sold for use as a toy, a log book and pencil for listing objects recorded may advantageously be supplied with the device.

It will be apparent that, by using the recording device which has been described, it is possible to preselect a particular object to be recorded and to manipulate the control knobs 8 until a picture of that object is visible in the display window 3. Thereafter, each time an object corresponding to the tracing 4 or other picture is observed, the first push button or plunger 17 is depressed once to register one unit on the digital counter 10. The counter 10 may subsequently be reset to register zero by the use of the second push button or plunger that is not illustrated in the drawings.

I claim:
1. A recording device in the form of a toy comprising a casing, said casing being provided with a display window, means for positioning alternative pictures within said casing for viewing through said display window, a telescope in said casing adapted for use in trying to view an object corresponding to the picture in the window, and a digital counter on said casing and operable to record the number of objects observed which correspond to a particular displayed picture.

2. A recording device as claimed in claim 1, wherein the casing comprises a front shell part, a rear shell part and a casing bottom which carries said means for positioning alternative pictures for viewing.

3. A recording device as claimed in claim 1, wherein said means for positioning alternative pictures for viewing comprises a length of strip having pictures disposed thereon in side-by-side relationship, spool means located at opposite sides of the display window and winding means arranged to enable said strip to be wound between the spool means to move selected pictures into a viewing position in the display window.

4. A recording device as claimed in claim 3, wherein said spool means comprises two spools and the winding means comprises two knobs rotatable in relatively opposite directions to wind the strip onto the corresponding spool.

5. A recording device as claimed in claim 1, wherein the digital counter includes a rotatable "units" disc, a rotatable "tens" disc and a rotatable "hundreds" disc and means operable to advance the "units" disc by one unit at each actuation thereof.

6. A recording device as claimed in claim 6, wherein the advancing means comprises a push button.

7. A recording device as claimed in claim 1, wherein the device simulates the appearance of a camera.

References Cited

UNITED STATES PATENTS

| | | | |
|---|---|---|---|
| 2,870,962 | 1/1959 | Klein | 235—117 X |
| 3,012,779 | 12/1961 | Friedman | 35—76 X |
| 3,073,523 | 1/1963 | Garland. | |
| 3,388,499 | 6/1968 | Mercorelli | 46—13 X |

LOUIS G. MANCENE, Primary Examiner

R. F. CUTTING, Assistant Examiner

U.S. Cl. X.R.

273—148